March 17, 1953

C. A. FROEBEL ET AL 2,632,068

EXPLOSIONPROOF GROUND CLAMP

Filed Aug. 1, 1950

Carlton A. Froebel
Paul R. Green   Inventors

By W. O. T Heilman attorney

March 17, 1953

C. A. FROEBEL ET AL 2,632,068

EXPLOSIONPROOF GROUND CLAMP

Filed Aug. 1, 1950

Carlton A. Froebel
Paul R. Green    Inventors

By W. O. J. Heilman    attorney

March 17, 1953  C. A. FROEBEL ET AL  2,632,068
EXPLOSIONPROOF GROUND CLAMP
Filed Aug. 1, 1950  3 Sheets-Sheet 3

Carlton A. Froebel  Inventors
Paul R. Green
By W. O. Heilman  attorney

Patented Mar. 17, 1953

2,632,068

UNITED STATES PATENT OFFICE 2,632,068

EXPLOSIONPROOF GROUND CLAMP

Carlton A. Froebel and Paul R. Green, Cranford, N. J., assignors to Standard Oil Development Company, a corporation of Delaware Application August 1, 1950, Serial No. 176,977

10 Claims. (Cl. 200—51.07)

The present invention relates to a device adapted to permit grounding of equipment, ships, railway cars, automotive vehicles and the like to discharge any potential electric charge therefrom including static charges or earth currents without arcing or sparking in the vicinity of the equipment of structure involved. More particularly, the invention relates to a ground clamp device in which the grounding contact is made or broken automatically and within an integral, explosion-proof housing for the terminal contact elements of the device.

In the service for which the present device is intended, it is standard and required procedure to accomplish grounding contact with the object to be grounded by means of a switch-controlled grounding circuit. Ordinarily, such a circuit may comprise a contact clamp member for attachment to the charged object, a conductor cable to a switch mechanism, and a connection between the switch and a ground discharge element. In such a circuit, the switch is usually disposed at some distance from the contact clamp. In use then, with the switch in an "off" position, to break the circuit, the contact clamp is attached. The operator then closes the circuit by manual manipulation of the switch to the "on" position, closing the circuit and grounding any static electric charge which may exist.

To be safe, such a system and procedure requires positive assurance that the switch be in the "off" position whenever grounding contact is to be made or broken, and also that the switch be in the "on" position, after contact has been made, in order that the required circuit be established. It has been found that regardless of every precaution, proper operation of the switch is frequently overlooked or avoided by those responsible. This has resulted in unsafe operating conditions in spite of the equipment provided.

It is an object of the present invention to provide a means whereby the negligence or thoughtlessness of the operator cannot prevent proper employment of the ground connection. It is also an object of the invention to provide an explosion-proof grounding clamp which is positively connected in a grounding circuit whenever full clamping contact is made with the object or equipment to be grounded, and which is disconnected from the circuit as soon as such contact is broken at the clamp. It is a further object of the invention to provide a ground clamp device in which the circuit is made and broken by engagement or removal of the clamp with the object or equipment to be grounded, without the employment of switching or circuit breaker means extraneous to the device itself. According to the present invention, the clamp and switching mechanism are provided in a single explosion-proof unit, the circuit being made and broken by a single operation in applying or removing the ground clamp.

The invention and its objects may be more fully understood from the following description when read in conjunction with the accompanying drawings, in which.

Figure 1:
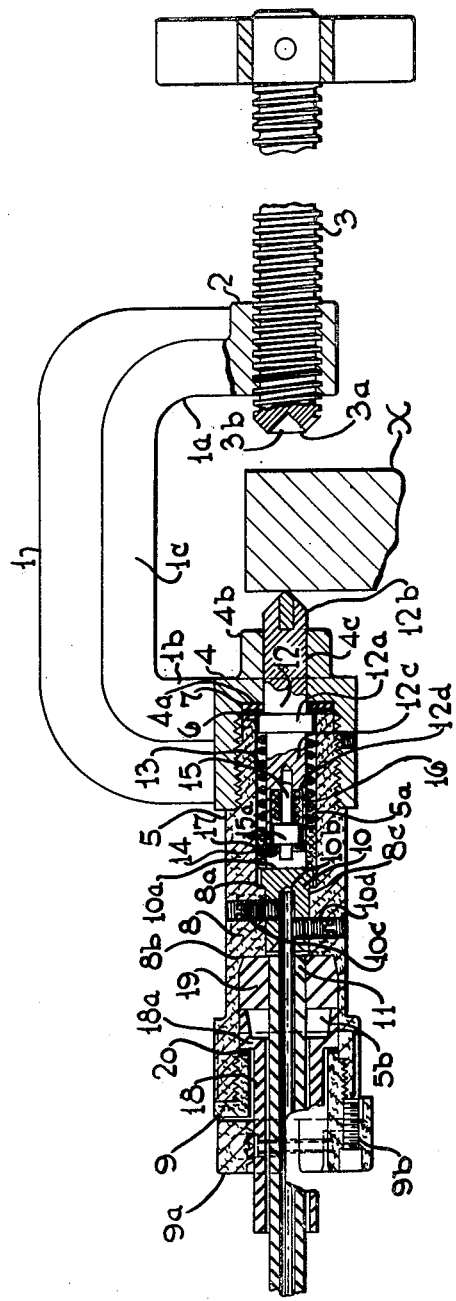
Fig. 1 is a side elevational view, partly in vertical section, of a preferred form of the device contemplated.
Figure 2:
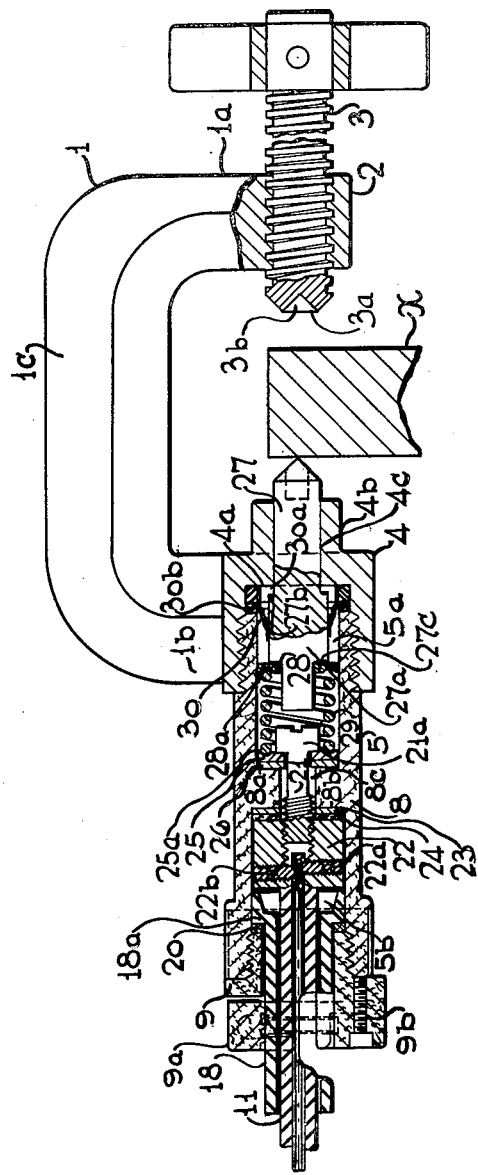
Fig. 2 is a similar view of another form of the device.

Referring more specifically to the drawings, in which like parts are designated by the same numerals, the numeral 1 designates a ground clamp which is a C-clamp or U-shaped member having opposed parallel leg portions 1a and 1b spaced and joined by a base portion 1c. As shown in Figs. 1 and 2, the leg portion 1a is provided at its outer end with a threaded eye 2 adapted to receive a threaded compression element 3. This element is illustrated as a T-bolt member, having a circular cutting edge portion 3a formed by a recess 3b in the tip of the bolt member. The other leg portion 1b is provided with a hollow bushing 4, disposed in opposition to the eye 2. The bushing 4 is interiorly threaded, and formed with an interior shouldered portion 4a, and a boss 4b, with a passageway 4c opening through the shouldered portion and boss inwardly of the leg portion 1b. The bushing, boss, and passageway are substantially coaxially related to the eye 2.

The numeral 5 designates a hollow tubular switch housing of a dieletric material exteriorly threaded at one end for engagement in the bushing 4, seating against suitable sealing means such as the annular washers 6 and 7. Preferably, the element 6 is of a relatively hard dielectric material, while the element 7 is of a relatively soft, compressible dielectric material such as natural or synthetic rubber. Interiorly, and intermediate the ends thereof, the housing is provided with an annular restricted portion 8, providing oppositely faced shouldered portions 8a and 8b, dividing the interior of the housing into inner and outer chambers 5a and 5b respectively, with an intermediate passageway 8c between them. The inner chamber is of substantially uniform diameter opening through the exteriorly threaded end of the housing and, when assembled with the clamp member, through the passageway 4c in bushing 4 and boss 4b. The outer chamber 5b is enlarged and interiorly threaded at the outer end of the housing, to receive an annular cap element 9, including an integrally formed cable clamp element 9a. A set screw 9b engageable with housing 5 is provided against accidental rotation of the cap 9.

The automatic contact, or switch elements of the device are substantially contained within the inner chamber 5a. As shown in Fig. 1, these elements include a fixed terminal contact or seating element 10, press-fitted in the passageway 8c, having an enlarged head 10a at one end engaging the shouldered portion 8a, and a cylindrical recess 10b extending into the body of the element from the other end and opening into the outer chamber 5b. This recess is adapted to receive the bare wire of a single conductor cable 11 passed into the chamber 5b and recess 10b by way of the cable clamp and cap 9a and 9 respectively. The element 10 is also provided with lateral, threaded openings 10c and 10d, communicating with the recess 10b, adapted to receive wire retainer and clamping elements such as set screws threaded therein. Corresponding passageways through the wall of the housing 5 are provided to permit introduction of the retainer elements and for the application thereof.

The movable terminal contact element is a plunger 12 provided with a shouldered or enlarged portion 12a intermediate the ends and essentially dividing the plunger into an outer portion 12b and an inner portion 12c. The outer portion is dimensioned for a reciprocally sliding fit in the passageway 4c and, with the shouldered portion engaged with washer element 6, is long enough to extend outwardly through the passageway 4c beyond the bushing 4 and boss 4b. The outer end of the portion 12b preferably is provided with a hard, pointed tip as by means of an insert of hardened steel or Stellite which, by virtue of the concentric relationship of bushing 4 and eye 2, will be substantially directly opposed to the recess 3b of the compression element 3.

Also within the inner chamber 5a of the housing 5 is a helical spring element 13 encircling the inner plunger portion 12c and held under compression between the shoulder 12a and an annular bushing 14 seated on the face of the head 10a of the fixed element 10. The outer diameter of the portion 12c and the inner diameter of the bushing 14 are related so as to provide for free reciprocal movement of the portion 12c within the bushing. The length of the bushing and of the portion 12c are related so that they overlap, with the portion 12c normally extending into the bushing, but spaced from the head 10a of the fixed contact element 10. In addition, as shown, the inner end of the portion 12c is provided with a cylindrical recess 12d having a reduced bore at its inner end to form a shouldered portion, and adapted to receive a floating contact assembly including a contact pin 15, helical spring 16, and a snap ring retainer element 17. The inner end of the pin 15 is reciprocally contained in the reduced bore of the recess and, adjacent the outer end, the pin is provided with an annular shouldered portion 15a providing a bearing against the snap ring 17 and a seat for the spring 16 which is held under compression between such seat and the recess shouldered portion. The outer end of the pin, the annular edge of the plunger portion 12c, and the face of the head 10a are preferably coated, as with a film of silver to improve conductivity.

At the other end of the housing 5, the cable 11 is enclosed by a sleeve seal 18 having an enlarged, flanged or shouldered inner end 18a provided to bear against an inner annular seal element 19 for the passageway 8c. The shouldered portion 18a of the cable sleeve 18 is of such dimensions as to be compressibly engaged by the cap 9 when threaded into the outer end of the housing. Preferably, a hard, dielectric washer 20 is disposed between the cap and shouldered portion to avoid friction and to permit rotation of the cap without distortion of the sleeve shoulder.

The conductor elements of the device may be of brass, bronze or equivalent material, including the clamp 1, and terminal contact element 10, but where corrosion or wear may be a problem, a harder material such as Monel metal may be employed. Preferably the compression element 3, plunger 12, the pin 15 and springs 13 and 16 should be of Monel metal. The cable wire may be of copper or the equivalent. Non-conducting elements of the device will be of dielectric materials, the rigid elements, including housing 5, cap 9, being preferably of molded fibre, plastic or fibre-plastic compositions, while the non-rigid elements may be of natural or synthetic, deformable, and compressible materials including rubber, neoprene, and the like.

In assembling the device as illustrated in Figs. 1 and 2, any logical sequence of steps may be followed once the fixed terminal contact 10 is inserted and secured in the passageway 8c, with the head portion 10a firmly seated against the shoulder 8a. Preferably, the bare wire of cable 11, to which the sleeve 18, seal 19, washer 20, and cap 9 have been applied, should next be inserted in the bore 10b of contact element 10, and the wire secured therein by means of set screws in the openings 10c and 10d therefor. The cap 9 may then be threaded into the housing portion 5b to effect the sealing relationships of the sleeve portion 18a and the seal 19 with the housing and cable, and the cable clamp 9a affixed to the cap. With the outer portions of the device thus assembled, the bushing 14, spring 13 and plunger portion 12c may be inserted into the housing chamber 5a, and the sealing washers 6 and 7 applied to plunger portion 12b. The portion 12b may then be introduced into passageway 4c, and the clamp 1 threaded onto the exteriorly threaded end of the housing, compressing the seal washer 7 against shoulder 4a and portion 12b, and thereby sealing the chamber 5a.

In use, the cable 11 is connected to a suitable permanent ground. The clamp is applied over any available free edge portion of the metallic object or equipment to be grounded, as shown in Fig. 1, the object edge portion being indicated in the drawing by the letter $x$. The compression element is then tightened, as by threading element 3 through eye 2, until the element 3 and plunger 12 are secured so as to penetrate any natural or applied surface coating on the object edge portion. During application, the pressure applied by means of the compression element forces the plunger inward until the inner end makes contact with the head 10a of the fixed terminal, and the circuit is completed. The pin 15 makes first contact with the head 10a but the annular edge of the recess 12d in the portion 12c of plunger 12 provides for final contact under pressure applied by the element 13. Upon removal of the clamp, withdrawal of the compression element through the clamp releases pressure on the plunger, and the compression spring in chamber 5a breaks the contact previously made. Although, as the gap between the movable and fixed terminal contact elements is narrowed, the static charge to be grounded may jump the gap, this can occur only within the housing 5, and not between the clamp and object, as by proper spacing of the elements, the plunger and compression elements will then be in close contact with the object, and no arc-producing gap will exist between them. Normal spacing of the terminal contact elements 10 and 12 and 15 will be determined by well known and conventional methods, and according to the service in which the clamp is employed.

The device, as illustrated in Fig. 2, is comparable to, but not identical with, that shown by Fig. 1. In the form illustrated, the fixed terminal contact element is designated by the numeral 21. It is a solid bolt-like element, somewhat longer than the passageway 8c, extending freely therethrough into the chamber 5b. In the chamber 5b is provided a solderless wire connector element 22 having a concentric passageway adapted at one end to receive the bare wire of cable 11, and having set screws 22a and 22b to engage and hold the wire in the passageway. The other or inner end of the passageway is interiorly threaded to receive the threaded bolt element 21, which when threaded into the connector passageway, will draw the connector 11 toward the shouldered portion 8b. A hard annular washer 23 and a soft seal washer 24 are disposed between the portion 8b and connector 22 and compressed therebetween. Preferably, the chamber 5b and connector 22 are shaped or formed so as to prevent rotation of the connector within the chamber. As shown, the head 21a of bolt element 21 is slotted or formed to receive a screw driver or other tool for making a rigid and vapor-proof connection. Within the chamber 5a, the head 21a seats against annular seal elements 25 and 26, of which the element 26 is a soft seal, while the element 25 is a hard washer element provided with an annular recess 25a beyond the periphery of the head 21a.

The movable terminal contact element in the chamber 5a is a solid element 27 having an enlarged portion 27a providing oppositely facing annular shoulders 27b and 27c. One end of the element 27 extends outwardly through the passageway 4c in bushing 4 and boss 4b, while the other end normally extends into spaced relation to the face of the head 21a of the fixed contact element 21. The inner end of the plunger 27 is supported by a concentric washer element 28, one face of which bears against the shoulder 27c. The other or inner face of the element 28 is provided with an annular recess 28a, coincident with the recess 25a in washer 25. Between the elements 25 and 28 is disposed a helical spring 29, the ends of which are received by the recesses 25a and 28a respectively. At the opposite or outer end of the plunger element 27, action of the spring 29 normally forces the shoulder 27b against the bushing shoulder 4a with the end and tip of the plunger 27 extending through and beyond the passageway 4c. A seal for the outer end of the plunger is provided by means of a substantially frusto-conical, hollow diaphragm 30 secured at the apex end to the enlarged portion 27a of element 27, inwardly of the shoulder 27b. The base end of the diaphragm is provided with an outwardly flanged portion 30a adapted to provide a sealing seat for the end of the housing 5 when threaded into the bushing 4. Preferably, a hard washer 30b of a dielectric material is interposed between the portion 30a and housing 5. The device, as illustrated in Fig. 2, is otherwise generally formed and constructed as set forth with reference to Fig. 1.

In assembling the device according to Fig. 2, the solderless connector 22 is first attached to the bare wire of cable 11, to which sleeve 18 and washer 20 have been applied, and then inserted into the chamber 5b along with the sealing washers 23 and 24. The contact element is next introduced through the passageway 8c, along with sealing elements 25 and 26, into engagement with the connector 22 and threaded into the connector so as to compress the soft washers 24 and 26 sealing the passageway 8c. The cap 9 and clamp 9a may then be applied to complete the ground connection, and the plunger 27 inserted into the chamber 5a, along with the spring 29 and washer 28, and the housing 5 threaded into the bushing 4 with the outer pointed end of the plunger extending into and through the passageway 4c.

Figure 3:
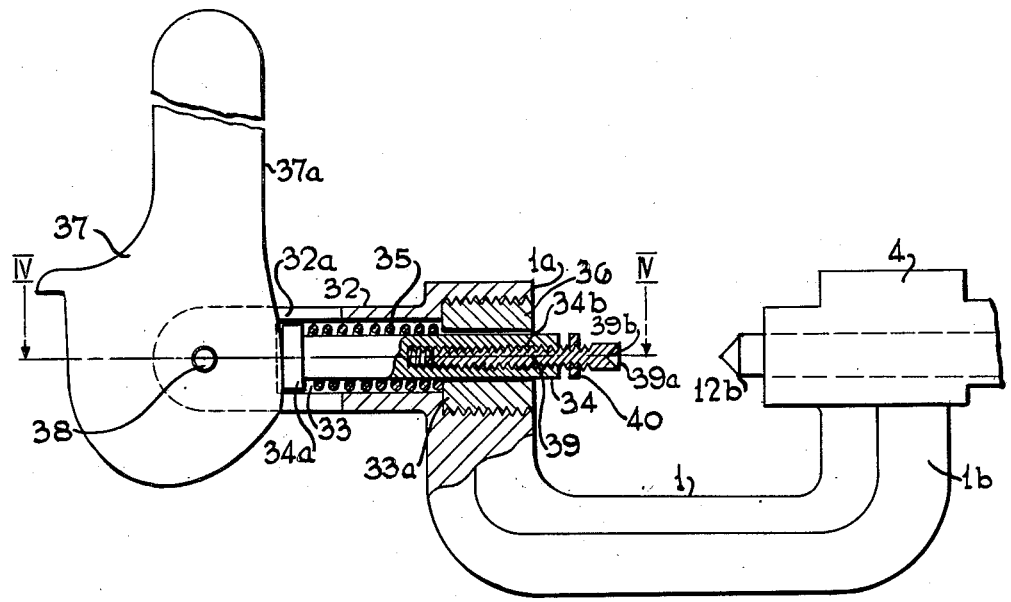
Fig. 3 is a similar view of an alternate means for providing contact between the clamp and the object or equipment to be grounded.
Figure 4:
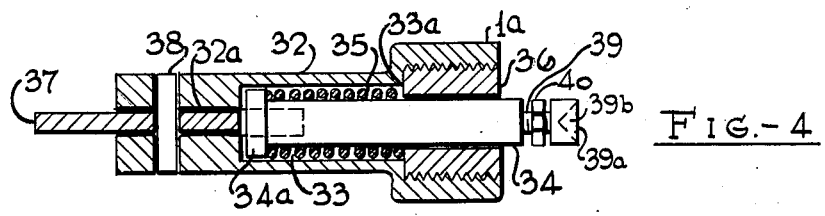
Fig. 4 is a horizontal section through the means according to Fig. 3, taken along the line IV—IV thereof.

In Figs. 3 and 4, the clamp member 1 is shown modified so as to permit employment of a cam operated compression means. In this form, the leg portion 1a is provided with an elongated boss 32 in place of the threaded eye of Fig. 1. The boss extends outwardly from the portion 1a and is provided with a concentric internal bore 33 extending thereinto through the inner surface of leg portion 1a and formed with an enlarged shouldered portion 33a substantially within the leg portion. The bore 33 is adapted to receive a pressure pin 34, having flanged head portion 34a at its inner end, and a helical spring member 35 encircling the pin. The bore 33 is closed by means of an annular plug element 36 having a central opening of lesser inner diameter than the bore, and fitted to the pin 34 so as to permit reciprocal movement in the central opening. The element 36 also provides a bearing for the outer end of spring 35, and when threaded into the enlarged portion of the bore, holds the spring under compression against the head 34a of pin 34 which is thus normally held against the inner end of the bore.

The outer end of the boss 32 is slotted, with the slotted portion 32a extending inwardly into the bore 33. A cam element 37, provided with an operating handle 37a, is rotatably supported in the slotted portion 32a by means of pivot pin 38, the cam being so shaped that when rotated to bring the handle into a diametrically opposite position, the cam surface will engage the pin element head 34a, forcing the pin forward against resistance of spring 35, extending the pin from the bore 33, through plug 36, toward the oppositely disposed plunger portion 12b. As shown, the outer end of pin 34 is provided with an interiorly threaded recess 34b, adapted to receive a threaded pin extension element 39 having a hardened steel head 39a with a cutting edge, work engagement portion 39b, formed by a recess 39c therein. A lock nut 40 is provided on element 39 to fix the element longitudinally with reference to the pin 34. By suitable adjustment of the extension element, the cam may be operated to engage the work between the pin 34 and plunger 12 in the same manner and with the same effect as by employment of the element 3 of Figs. 1 and 2. The cam arrangement, however, facilitates employment of the device, by faster operation.

Figure 5:
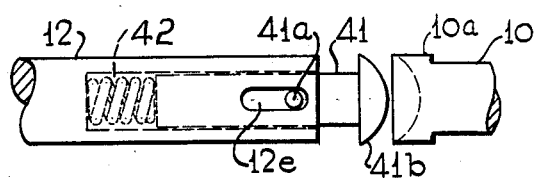
Fig. 5 is side elevational view of another form of floating contact switch element and seat, alternative to the form shown by Fig. 1.

As an alternate to the floating contact assembly of Fig. 1, the assembly according to Fig. 5 may be employed. In this assembly, the contact pin 41 is of uniform diameter and fitted to a bore 42 in plunger 12 for reciprocal movement therein. A helical spring 43, disposed under compression, between the inner end of the bore and the inner end of the contact pin normally extends the pin 41 from the bore toward the fixed seating contact element 10 or 21, longitudinal movement of the pin 41 being limited by means of a dowel 41a diametrically through the pin, and extending laterally therefrom, to slide in the opposed slotted portions 12e opening into the bore 42. Also as shown, the pin 41 may be provided with a shaped head portion 41b adapted to engage a recess in the head portion of the fixed contact element. Where a rounded head is employed, the radius of curvature thereof should be slightly less than the curvature of the recess in the head portion.

What is claimed is:

1. A ground clamp, comprising in combination a yoke member including a pair of leg portions rigidly joined and spaced by a connecting base portion, a passageway opening through one leg portion of said yoke, an eye in said other leg portion, said passageway and eye being disposed in substantially coaxial relation one to another; a ground contact switch including a tubular housing member, having an outer end and an inner end adapted for threaded engagement with one leg portion, coaxially with the passageway therethrough, and in substantially fluid-tight relation therewith, an annular shoulder interiorly of said housing intermediate the ends thereof, said shoulder dividing the housing interior into an inner chamber opening through said passageway, and an outer chamber opening through the outer end of said housing and providing a restricted passageway through said shoulder connecting said inner and outer chambers; a fixed contact element in said housing, including a body portion disposed within said restricted shoulder passageway, and an enlarged head portion disposed within said inner chamber seated on and in substantially fluid-tight relation to said annular shoulder; an elongated movable contact element disposed within said inner chamber for reciprocal movement longitudinally thereof, having an outer end extending outwardly from said chamber inwardly of said yoke, an inner end normally disposed in spaced relation to said fixed contact element, and an annularly enlarged body portion intermediate said ends forming inwardly and outwardly faced shoulder portions on said element; an expansion coil spring means encircling the inner end of said movable contact element supported at one end against said housing shoulder, and at the other end against said inwardly faced movable contact element shoulder portion; means for attaching a ground cable wire to said fixed contact element body portion; a closure seal assembly for the outer end of said housing; and a compression element carried in the eye in said other leg portion in coaxial opposition to the outer end of said movable contact element, said elements adapted rigidly to engage an object to be grounded with said movable contact element seated against the fixed contact element establishing a continuous circuit with said cable wire.

2. A ground clamp according to claim 1, in which there is provided an annular bushing of a dielectric material interposed between said spring means and said fixed contact element, said bushing extending longitudinally of said inner housing chamber into overlapping peripheral relation to the inner end of said movable contact element.

3. A ground clamp according to claim 1, in which said means for attaching a ground cable wire to said fixed contact element body portion comprises a cylindrical bore concentrically of said body portion opening into the outer housing chamber and adapted to receive said cable wire, a pair of laterally opposed, offset, corresponding, threaded passageways through each of said housing and fixed contact element body portion, communicating with said cylindrical bore, and a pair of set screw elements threadable into said passageways with the inner ends extending into said bore so as rigidly to engage a cable wire therein.

4. A ground clamp according to claim 1, in which said fixed contact element is a threaded bolt member, of which the body portion extends outwardly into the outer housing chamber, a capnut for said bolt member and means substantially integral with said capnut adapted to receive and retain a ground cable wire in fixed contact relation thereto.

5. A ground clamp according to claim 1, in which said compression element contained by said clamp is a wing bolt member having a tip or end opposed to said plunger.

6. A ground clamp according to claim 1, in which said compression element is a cam operated pressure pin element reciprocally disposed in a bore contained by said clamp.

7. A ground clamp according to claim 1, in which said movable contact element includes floating contact means for engagement with said fixed contact terminal element comprising a concentric bore extending longitudinally into the inner end of said movable contact element, said bore having a reduced portion at its inner end forming an annular shoulder concentric with said portion, a floating contact pin slidably fitted in said reduced bore portion at one end, an enlarged annular shouldered portion adjacent the other end of said pin, a helical spring in said bore concentric with said pin, disposed under slight compression between the said annular shoulder of said bore and said pin annular shoulder portion, and an annular retainer ring in said bore adjacent the outer end thereof engageable by said pin annular shoulder portion.

8. A ground clamp comprising in combination a yoke member including a pair of leg portions rigidly joined and spaced by a connecting base portion, a passageway opening through one leg portion of said yoke, an eye in said other leg portion, said passageway and eye being disposed in substantially coaxial relation one to another; a ground contact switch including a tubular housing member, having an outer end and an inner end adapted for threaded engagement with one leg portion coaxially with the passageway therethrough and in substantially fluid-tight relation therewith, an annular shoulder interiorly of said housing intermediate the end thereof, said shoulder dividing the interior of the housing into an inner chamber opening through said leg portion passageway, and an outer chamber opening through the outer end of said housing and providing a restricted passageway through said shoulder connecting said inner and outer chambers; a threaded bolt member in said housing, including an enlarged head portion disposed within said inner chamber seated on said annular shoulder and an elongated threaded body portion extending outwardly through said restricted passageway into the outer chamber, a capnut for said bolt member disposed interiorly of said outer chamber, said capnut adapted for threaded engagement with said bolt member body portion so as to engage said annular housing shoulder in substantially fluid-tight relation between said capnut and said bolt member enlarged head portion, and means substantially integral with said capnut adapted to receive and retain a ground cable wire in fixed contact relation thereto, said bolt member and capnut forming a fixed contact element exposed within said inner chamber; a movable contact element disposed within said inner chamber, said element including an elongated body portion having an inner end normally disposed in spaced relation to said fixed contact element, an outer end extending outwardly from said chamber through and beyond said leg portion passageway, and an annular enlargement of said body portion intermediate said ends forming inwardly and outwardly faced shoulders on said element; a cylindrical recess extended into the inner end of said movable contact element and a floating contact assembly disposed in said recess which includes a contact pin coaxially with said recess, reciprocally movable longitudinally thereof, one end of said pin normally extending outwardly from said recess, means for retaining said pin in said recess, and spring means in said recess adapted normally to extend said pin therethrough; a closure seal assembly for the outer end of said housing; and a wing bolt compression element carried in the eye in said other leg portion in substantially coaxial opposition to the outer end of said movable contact element, said compression and movable contact elements adapted rigidly to engage an object to be grounded with said movable contact element seated against the fixed contact element within said housing to establish a continuous circuit with said cable wire.

9. In an apparatus according to claim 8, a floating contact assembly in which said pin is an elongated element having an annular shoulder portion intermediate the ends thereof and said spring means is a helical spring encircling said pin disposed between said shoulder portion and the bottom of said recess under slight compression to force said shoulder against said means for retaining the pin in said recess.

10. In an apparatus according to claim 8, a floating contact assembly in which said pin is an elongated element of uniform diameter, having an inner end and an outer end, adapted for a sliding fit in said recess, said spring means is a helical coil spring disposed between the inner end of said pin and the bottom of said recess, and the means for retaining said pin in the bore is a slotted portion longitudinally of the inner end of said movable contact element and a dowel extended diametrically through said pin, engaged in said slotted portion.

CARLTON A. FROEBEL.
PAUL R. GREEN.

REFERENCES CITED

The following references are of record in the file of this patent:

UNITED STATES PATENTS

| Number | Name | Date |
|---|---|---|
| 812,400 | Bremer | Feb. 13, 1906 |
| 903,842 | Conniff | Nov. 17, 1908 |
| 2,364,237 | Neff | Dec. 5, 1944 |
| 2,477,467 | Rose | July 26, 1949 |